(12) United States Patent
Takagi (10) Patent No.: US 8,283,063 B2
(45) Date of Patent: Oct. 9, 2012

(54) POWER SUPPLY DEVICE (75) Inventor: Masaru Takagi, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 437 days.

(21) Appl. No.: 12/298,946

(22) PCT Filed: Jan. 9, 2008

(86) PCT No.: PCT/IB2008/000033
§ 371 (c)(1),
(2), (4) Date: Oct. 29, 2008

(87) PCT Pub. No.: WO2008/093184
PCT Pub. Date: Aug. 7, 2008

(65) Prior Publication Data
US 2009/0280394 A1  Nov. 12, 2009

(30) Foreign Application Priority Data

Feb. 1, 2007 (JP) .................. 2007-023593

(51) Int. Cl.
*H01M 2/12* (2006.01)
*H01M 2/36* (2006.01)
*H01M 10/50* (2006.01)
*G05D 23/00* (2006.01)

(52) U.S. Cl. ............ 429/71; 429/72; 429/120; 165/288

(58) Field of Classification Search .................. 429/71, 429/72, 120; 165/288
See application file for complete search history.

(56) References Cited

U.S. PATENT DOCUMENTS

| 3,892,104 | A  | * | 7/1975 | Klee et al. ................. 62/186 |
| 5,447,807 | A  | * | 9/1995 | Peled et al. ................. 429/62 |
| 6,335,116 | B1 | * | 1/2002 | Yamane et al. ............. 429/176 |
| 6,596,433 | B2 | * | 7/2003 | Gudmundsson et al. ...... 429/62 |
| 6,936,372 | B1 | * | 8/2005 | Jagota et al. ................. 429/50 |
| 7,217,473 | B2 | * | 5/2007 | Ovshinsky et al. ............. 429/62 |

FOREIGN PATENT DOCUMENTS

| JP | 01-269448 A | 10/1989 |
| JP | 06-124733 A | 5/1994 |
| JP | 10-199497 A | 7/1998 |
| JP | 2001-060446 A | 3/2001 |
| JP | 2003-346924 A | 12/2003 |
| JP | 2005-019134 A | 1/2005 |
| JP | 2005-199972 A | 7/2005 |
| JP | 2005-310596 A | 11/2005 |

* cited by examiner

*Primary Examiner* — Patrick Ryan
*Assistant Examiner* — Julian Anthony
(74) *Attorney, Agent, or Firm* — Kenyon & Kenyon LLP (57) ABSTRACT

In a power supply device, a power supply body, and a cooling liquid that cools the power supply body are housed in a power supply casing. The power supply device includes a plurality of agitation members that agitate the cooling liquid; and a transmission mechanism that transmits driving power from a drive motor to each of the agitation members. Examples of the transmission mechanism include a gear, a belt, and a chain.

12 Claims, 9 Drawing Sheets

POWER SUPPLY DEVICE

This is a 371 national phase application of PCT/IB2008/000033 filed 9 Jan. 2008, claiming priority to Japanese Patent Application No. 2007-023593 filed 1 Feb. 2007, the contents of which are incorporated herein by reference.

BACKGROUND OF THE INVENTION

1. Field of the Invention

The invention relates to a power supply device in which a power supply body, and a cooling liquid that cools the power supply body are housed in a power supply casing. More specifically, the invention relates to a method of agitating a cooling liquid.

2. Description of the Related Art

A power supply device, in which a power supply body is immersed in a cooling liquid, is available as a power supply device for a vehicle such as a hybrid vehicle, an electric vehicle, or a fuel-cell vehicle. In the power supply body, a plurality of power supply elements are arranged.

In such a power supply body, the power supply elements generate heat at the time of charging/discharging. Thus, there may be the temperature variation among the power supply elements. For example, in the assembled battery in which a plurality of cylindrical power supplies are disposed in parallel with each other between a pair of support members, as the cylindrical power supply is positioned closer to the center portion of the assembled battery, the cylindrical power supply has a higher temperature, and deteriorate at a higher rate. If a part of the cylindrical power supplies deteriorates in this manner, the entire assembled battery needs to be replaced.

Accordingly, to extend the lifetime of the power supply device, it is necessary to reduce the temperature variation among the power supply elements, by equalizing the temperature of the cooling liquid after the cooling liquid cools the power supply body, and therefore the temperature of the cooling liquid varies depending on the portion of the cooling liquid.

Japanese Patent Application Publication No. 6-124733 (JP-A-6-124733) describes the configuration for equalizing the temperature of the cooling liquid. More specifically, in the configuration described in the publication No. 6-124733, a cooling liquid is filled in a box container that houses a plurality of unit cells, and an agitation member is provided close to the peripheral portion of the box container. Fins provided in the lower end portion of the agitation member are placed in the cooling liquid. By rotating the agitation member, the cooling liquid is agitated.

Japanese Patent Application Publication No. 2003-346924 (JP-A-2003-346924) describes the configuration in which a cooling liquid that cools a lead battery is filled in a battery container, and the cooling liquid is circulated in areas inside and outside the container by a forcing pump.

However, in the configuration described in the publication No. 6-124733, because the agitation member is provided close to the peripheral portion of the box container, a restriction is imposed on the agitation position, and therefore, the temperature of the entire cooling liquid cannot be equalized. Accordingly, as the unit cell is positioned farther from the agitation member, the unit cell is cooled less sufficiently.

Also, when a plurality of agitation members are provided, it is necessary to provide drive motors according to the number of the agitation members. This increases the cost.

Also, when a forced circulation method is employed to forcibly circulate the cooling liquid, the cooling liquid stagnates in regions close to the inner peripheral wall of the battery container. Thus, the temperature of the entire cooling liquid cannot be equalized.

SUMMARY OF THE INVENTION

The invention reduces variation in the temperature distribution of a cooling liquid, while reducing the cost of a power supply device, and improving flexibility in setting agitation positions.

A first aspect of the invention relates to a power supply device in which a power supply body, and a cooling liquid that cools the power supply body are housed in a power supply casing. The power supply device includes a plurality of agitation members that agitate the cooling liquid; a drive motor that drives the agitation members; and a transmission mechanism that transmits driving power from the drive motor to each of the agitation members.

In the first aspect, the agitation members may include a first agitation member disposed at a center of the power supply casing, and a second agitation member disposed in a corner portion of the power supply casing. In the above-described aspect, the transmission mechanism may include gears that are attached to rotational shafts of the first agitation member and the second agitation member, respectively, and that engage with each other. In the above-described aspect, the first agitation member and the second agitation member may be gears that constitute a portion of the transmission mechanism, and that engage with each other.

In the above-described aspect, the power supply body may be fixed to an upper wall portion of the power supply casing, and the agitation members may be disposed below the power supply body.

In the first aspect, the agitation members may include a plurality of rotational shafts and an agitation fin formed on each of the rotational shafts. The transmission mechanism may be a belt or a chain that connects the rotational shafts. In the above-described aspect, the power supply body may be formed by disposing a plurality of cylindrical power supplies between a pair of support members such that axes of the cylindrical power supplies extend in parallel with each other. Each of the rotational shafts may be disposed in parallel with an axial direction of each of the cylindrical power supplies.

In the above-described aspect, bearing portions for at least one of the rotational shafts may be formed in the respective support members.

The power supply device according to the above-described aspect may further include a first temperature sensor provided in the power supply casing at a position above the power supply body; and a second temperature sensor provided in the power supply casing at a position below the power supply body. The power supply device according to the above-described aspect may further include a control portion that drives the drive motor when a difference between a first temperature detected by the first temperature sensor and a second temperature detected by the second temperature sensor is equal to or above a predetermined value.

A method of agitating the cooling liquid in the power supply device according to the above-described aspect may include determining a difference between a first temperature detected by the first temperature sensor and a second temperature detected by the second temperature sensor; determining whether the determined difference is equal to or above a predetermined value; determining whether the motor is being driven; and driving the motor when it is determined that the difference is equal to or above the predetermined value, and the motor is stopped.

In the above-described aspect, the agitation members are driven by transmitting driving power from the drive motor to the agitation members via the transmission mechanism. Therefore, the flexibility in setting the agitation positions is increased, and the cost is reduced by reducing the number of drive motors.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described with reference to the drawings.

Figure 1:
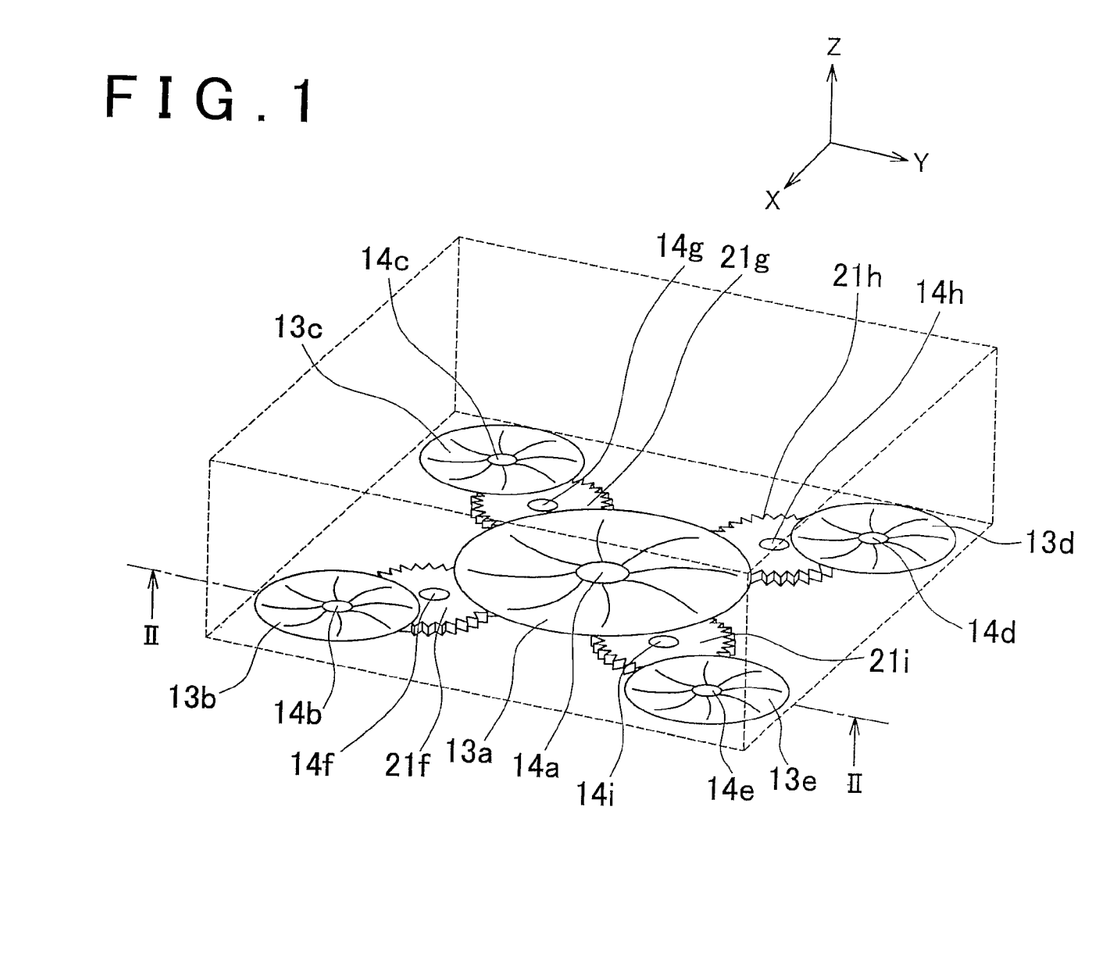
FIG. 1 is a perspective view showing a plurality of agitation members that agitate a cooling liquid in a power supply casing according to a first embodiment of the invention.
Figure 2:
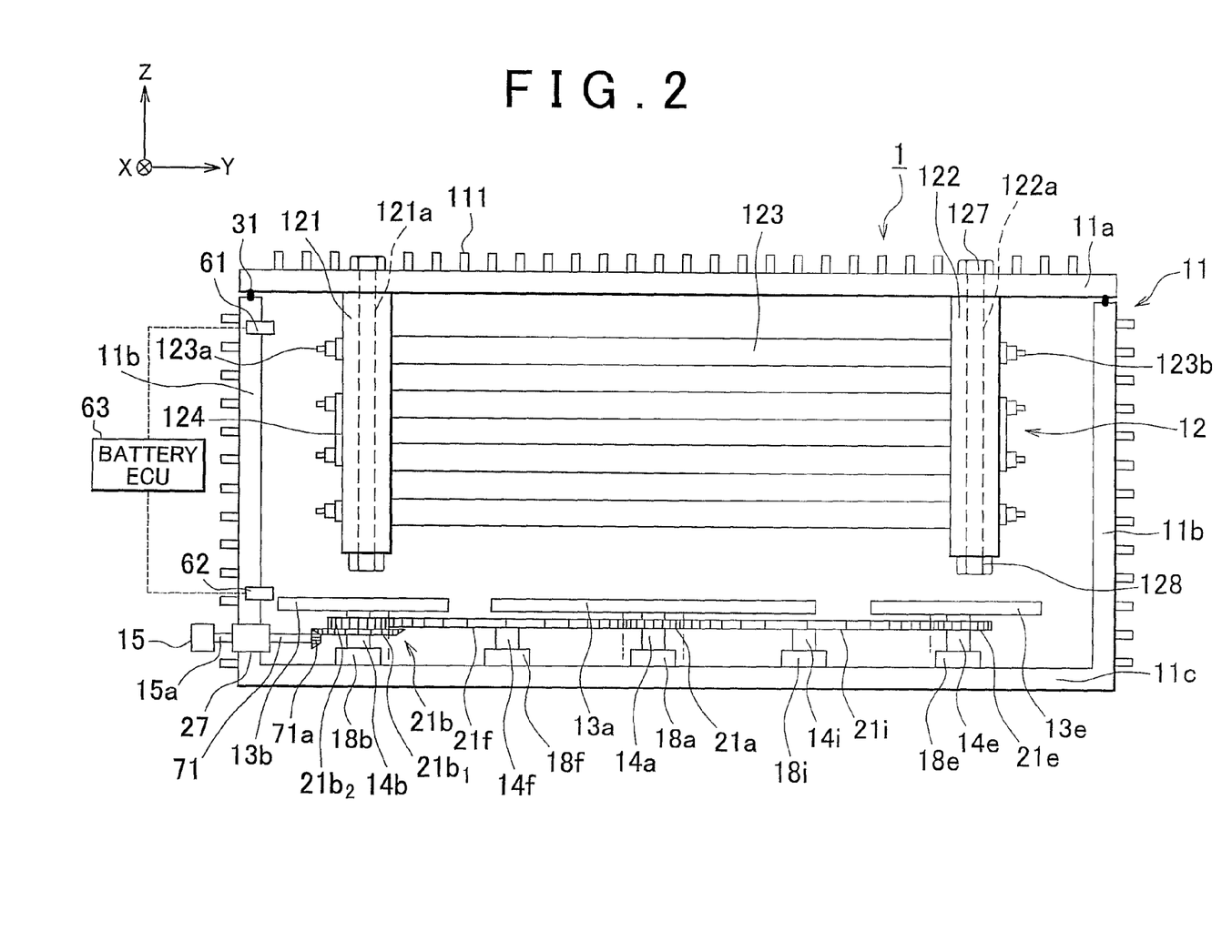
FIG. 2 is a cross sectional view showing a power supply device, taken along line II-II in FIG. 1.

Hereinafter, a first embodiment of the invention will be described. FIG. 1 is a perspective view showing an agitation mechanism that agitates a cooling liquid in a power supply casing. The dotted line indicates the outline of the power supply casing. FIG. 2 is a cross sectional view taken along line II-II in FIG. 1. A large agitation plate 13a, transmission gears, and the like are projected on the cross section shown in FIG. 2.

A power supply device 1 according to the invention is fixed to, for example, a floor panel of a vehicle. The power supply device 1 is used to drive an electric vehicle, a hybrid vehicle, or a fuel-cell vehicle. Alternatively, the power supply device 1 is used as an auxiliary power supply device for the electric vehicle, the hybrid vehicle, or the fuel-cell vehicle.

The power supply device 1 includes a power supply casing 11 filled with a cooling liquid, and an assembled battery 12 immersed in the cooling liquid. A plurality of agitation plates 13a to 13e are rotated in the cooling liquid to equalize the temperature of the cooling liquid after the cooling liquid cools the assembled battery 12, and therefore the temperature of the cooling liquid varies depending on the portion of the cooling liquid. That is, the plurality of agitation plates 13a to 13e suppress variation in the temperature of the cooling liquid.

The large agitation plate 13a is disposed at the center of the power supply casing 11. The small agitation plates 13b to 13e are disposed close to four corner portions of the power supply casing 11. Thus, it is possible to reliably agitate portions of the cooling liquid in regions close to the inner peripheral wall of the power supply casing 11. The cooling liquid is likely to stagnate in the regions close to the inner peripheral wall if the forced circulation system in the related technology is employed.

Further, output from a motor 15 is transmitted to the plurality of agitation plates 13a to 13e via a transmission mechanism described later, to rotate the agitation plates 13a to 13e. Thus, the number of motors 15 is reduced, and accordingly, the cost is reduced. The configuration of each portion of the power supply device 1 that has the above-described effects will be described in detail.

As shown in FIG. 2, the assembled battery 12 is formed by disposing a plurality of cylindrical cells (cylindrical power supplies) 123 between a pair of cell folders (support members) 121, 122 such that axes of the cylindrical cells extend in parallel with each other. The cell folders 121, 122 face each other. The assembled battery 12 is fixed to the upper wall portion 11a of the power supply casing 11.

Screw shaft portions 123a, 123b are formed in one end and the other end of each cylindrical cell 123, respectively. A matrix of insertion holes (not shown) is formed in each of the cell folders 121, 122. The screw shaft portions 123a, 123b of each cylindrical cell 123 are inserted through the insertion holes. The screw shaft portions 123a, 123b extend through the insertion holes, and protrude outward from the cell folders 121, 122, respectively. The cell folders 121, 122 are made of insulating resin.

The adjacent cylindrical cells 123 are connected to each other in series by bus bars 124. Folder through-holes 121a, 122a are formed in the cell folders 121, 122, respectively. The folder through-holes 121a, 122a extend in a vertical direction. Assembled-battery fixing bolts 127 are inserted from the outside of the power supply casing 11 into the folder through-holes 121a, 122a. The assembled-battery fixing bolts 127 are used to hang and support the assembled battery 12.

The end portions of the assembled-battery fixing bolts 127 protrude from the lower end surfaces of the cell folders 121, 122. Assembled-battery fixing nuts 128 are fastened to the end portions of the assembled-battery fixing bolts 127. Thus, the assembled battery 12 is fixed to the upper wall portion 11a of the power supply casing 11.

When the assembled-battery fixing bolts 127 and the assembled-battery fixing nuts 128 are fastened to each other, the assembled battery 12 is disposed above the agitation plates 13a to 13e. Thus, it is possible to prevent interference between the agitation plates 13a to 13e, and the assembled battery 12. Also, the low-temperature lower portion of the cooling liquid is reliably moved upward due to the agitation action of the agitation plates 13a to 13e.

A plurality of radiation fins 111 are formed on the outer wall portion of the power supply casing 11 (excluding the lower wall portion 11c). The radiation fins 111 promote the radiation of heat from the power supply device 1. The power supply casing 11 is made of, for example, a metal material or resin.

The cooling liquid for cooling the assembled battery 12 is filled in the power supply casing 11. It is appropriate to employ, as the cooling liquid, a material which has high specific heat, high heat conductivity, and a high boiling point, and which does not cause corrosion of the power supply casing 11 and the assembled battery 12, and in which heat decomposition, air oxidation, and electrolysis are unlikely to occur. Further, the cooling liquid may be an electrically-insulating liquid, to prevent short circuit between electrode terminals. For example, a fluorine inert liquid may be used. Examples of the fluorine inert liquid include Fluorinert™, Novec™ HFE (hydrofluoroether), and Novec™ 1230, which are made by 3M Company. Also, a liquid other than the fluorine inert liquid (for example, silicone oil) may be used.

A first temperature sensor 61 and a second temperature sensor 62, which protrude into the cooling liquid, are provided on the side wall portion 11b of the power supply casing 11. The first temperature sensor 61 is disposed above the assembled battery 12. The second temperature sensor 62 is disposed below the assembled battery 12.

After the cooling liquid cools the assembled battery 12, the temperature of the cooling liquid is increased, and thus, the cooling liquid moves upward in the power supply casing 11 due to a difference in specific gravity. Accordingly, by disposing the temperature sensors 61, 62 above and below the assembled battery 12, it is possible to accurately determine the variation in the temperature of the entire cooling liquid.

Figure 3:
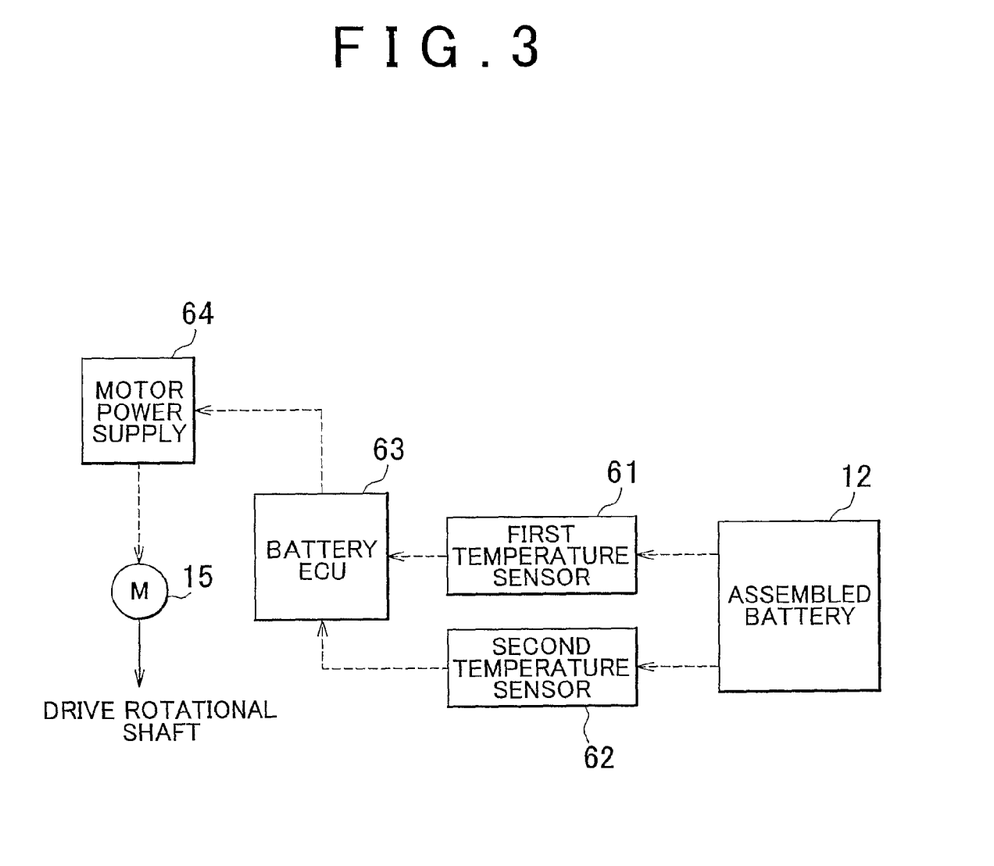
FIG. 3 is a block diagram of a control circuit that controls driving of a motor according to the first embodiment of the invention.

The first and second temperature sensors 61, 62 are electrically connected to a battery ECU 63. FIG. 3 is a block diagram of a control circuit that controls driving of the motor 15. As shown in FIG. 3, on the basis of temperature information output from the first and second temperature sensors 61, 62, the battery ECU 63 turns a switch of a motor power supply 64 on when the difference between the cooling liquid temperatures detected by the first and second temperature sensors 61, 62 is equal to or above 5° C. The battery ECU 63 turns the switch of the motor power supply 64 off when the difference between the cooling liquid temperatures is below 5° C. The motor 15 will be described in detail later.

An oil seal 31 is provided between the side wall portion 11b and the upper wall portion 11a of the power supply casing 11. The oil seal 31 reliably seals the cooling liquid in the power supply casing 11.

Next, the configuration of the plurality of agitation members that agitate the cooling liquid will be described in detail, with reference to FIG. 1 and FIG. 2. A center rotational shaft 14a, which extends in the vertical direction, is disposed at the center of the power supply casing 11. The lower end portion of the center rotational shaft 14a is rotatably supported by a center bearing portion 18a of radial type, which is fixed on the bottom portion of the power supply casing 11.

The large agitation plate (first agitation member) 13a, which agitates the cooling liquid, is attached to the upper end portion of the center rotational shaft 14a. A center transmission gear (spur gear) 21a is attached to the center rotational shaft 14a at a position between the large agitation plate 13a and the center bearing portion 18a. The center transmission gear 21a has a smaller diameter (i.e., a smaller horizontal length) than that of the large agitation plate 13a.

First to fourth corner rotational shafts 14b to 14e, which extend in the vertical direction, are disposed close to the four corners of the power supply casing 11, respectively. The lower end portions of the first to fourth corner rotational shafts 14b to 14e are rotatably supported by first to fourth corner bearing portions 18b to 18e of radial type, which are fixed on the bottom portion of the power supply casing 11. The second and third corner bearing portions 18c, 18d are not shown.

A first small agitation plate (second agitation member) 13b, which agitates the cooling liquid, is attached to the upper end portion of the first corner rotational shaft 14b. A first corner transmission gear 21b is attached to the first corner rotational shaft 14b at a position between the first small agitation plate 13b and the first corner bearing portion 18b. The first corner transmission gear 21b is a two-stage gear that includes a lower transmission gear (bevel gear) $21b_1$ and an upper transmission gear (spur gear) $21b_2$.

Second to fourth small agitation plates (second agitation members) 13c to 13e, which agitate the cooling liquid, are attached to the upper end portions of the second to fourth corner rotational shafts 14c to 14e, respectively. Second to fourth transmission gears (spur gears) 21c to 21e are attached to the second to fourth corner rotational shafts 14c to 14e at positions between the second to fourth small agitation plates 13c to 13e, and the second to fourth corner bearing portions 18c to 18e, respectively. The second and third transmission gears 21c, 21d are not shown.

The upper transmission gear $21b_2$ attached to the first corner rotational shaft 14b engages with a first intermediate transmission gear (spur gear) 21f. The first intermediate transmission gear 21f engages with the center transmission gear 21a attached to the center rotational shaft 14a. The first intermediate transmission gear 21f is fixed to the upper end portion of a first intermediate transmission gear rotational shaft 14f. The lower end portion of the first intermediate transmission gear rotational shaft 14f is rotatably supported by a first intermediate bearing portion 18f provided on the bottom portion of the power supply casing 11.

The second to fourth corner transmission gears 21c to 21e engage with second to fourth intermediate transmission gears (spur gears) 21g to 21i, respectively. The second to fourth intermediate transmission gears (spur gears) 21g to 21i engage with the center transmission gear 21a attached to the center rotational shaft 14a.

The second to fourth intermediate transmission gears 21g to 21i are fixed to upper end portions of second to fourth intermediate transmission gear rotational shafts 14g to 14i, respectively. The lower end portions of the second to fourth intermediate transmission gear rotational shafts 14g to 14i are rotatably supported by the second to fourth intermediate bearing portions 18g to 18i, respectively. The second and third intermediate bearing portions 18g, 18h are not shown.

The motor 15 is disposed outside the power supply casing 11. The output shaft 15a of the motor 15 extends into a rotational plate housing portion 27 provide in the wall portion of the power supply casing 11.

Figure 4:
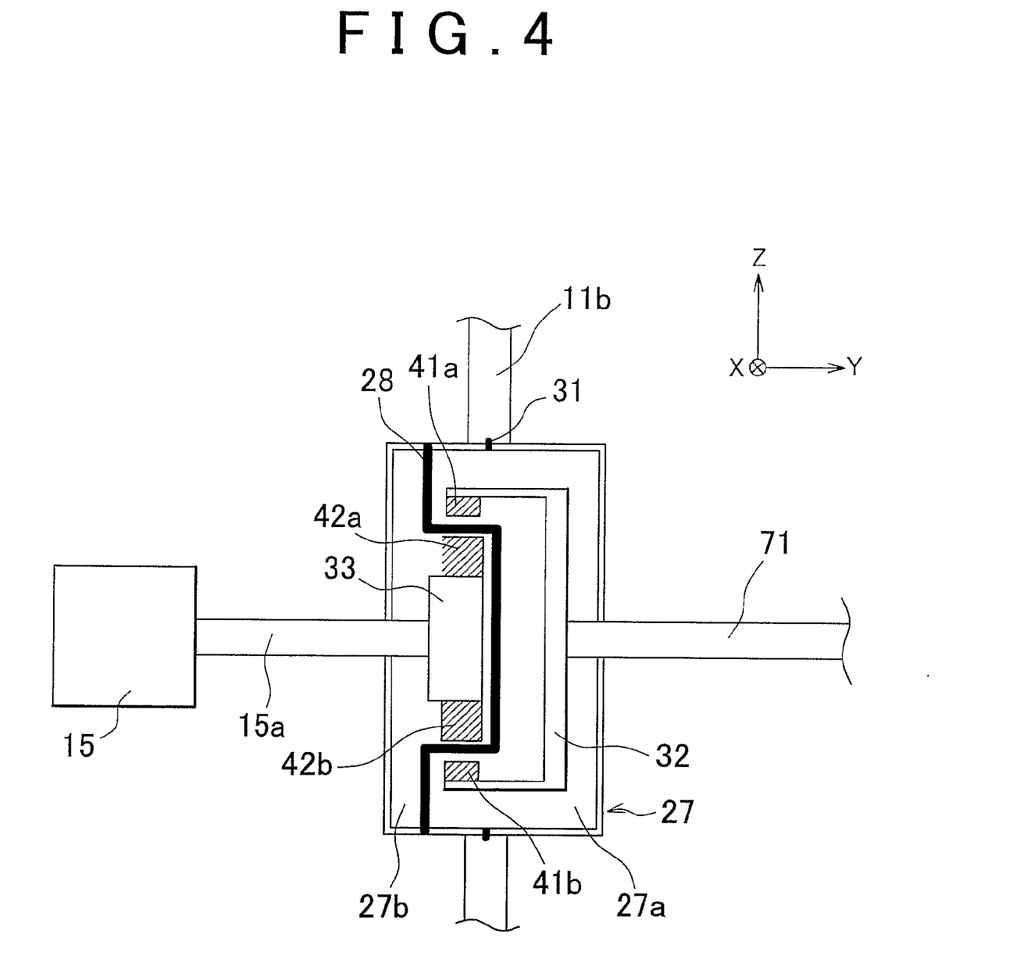
FIG. 4 is a cross sectional view showing a rotational plate housing portion according to the first embodiment of the invention.

The configuration of the rotational plate housing portion 27 will be described with reference to FIG. 4. FIG. 4 is a cross sectional view showing the rotational plate housing portion 27. The rotational plate housing portion 27 has a housing space that has a larger length (in a Y-axis direction) than the thickness of the side wall portion 11b of the power supply casing 11.

The housing space is divided into two chambers, that is, right and left chambers by a partition wall 28 that has a hat shape. A gear rotational shaft 71 is provided coaxially with the output shaft 15a, and the partition wall 28 is interposed between the output shaft 15a and the gear rotational shaft 71. An output gear (bevel gear) 71a (refer to FIG. 2) is attached to the end portion of the gear rotational shaft 71. The output gear 71a engages with the lower transmission gear $21b_1$ attached to the first corner rotational shaft 14b.

A cylindrical rotational plate 32 with a bottom is attached to the base end portion of the gear rotational shaft 71. Magnets 41a and magnets 41b are attached to the inner peripheral surface of the rotational plate 32 such that the magnets 41a and the magnets 41b are alternately disposed in a circumferential direction. Each of the magnets 41a has a north pole in the outer portion thereof. Each of the magnets 41b has a south pole in the outer portion thereof.

A bearing portion (not shown) for the gear rotational shaft 71 is provided in the right chamber of the rotational plate housing portion 27.

A magnet attachment plate 33 having a disc shape is attached to the end portion of the output shaft 15a of the motor 15. Magnets 42a and magnets 42b are attached to the peripheral surface of the magnet attachment plate 33 such that the magnets 42a and the magnets 42b are alternately disposed in the circumferential direction. Each of the magnets 42a has a north pole in the outer portion thereof. Each of the magnets 42b has a south pole in the outer portion thereof.

With the above-described configuration, the gear rotational shaft 71 is rotated according to the rotational motion of the output shaft 15a of the motor 15, due to the magnetic action of the magnets 41a, 41b, 42a, 42b.

Figure 5:
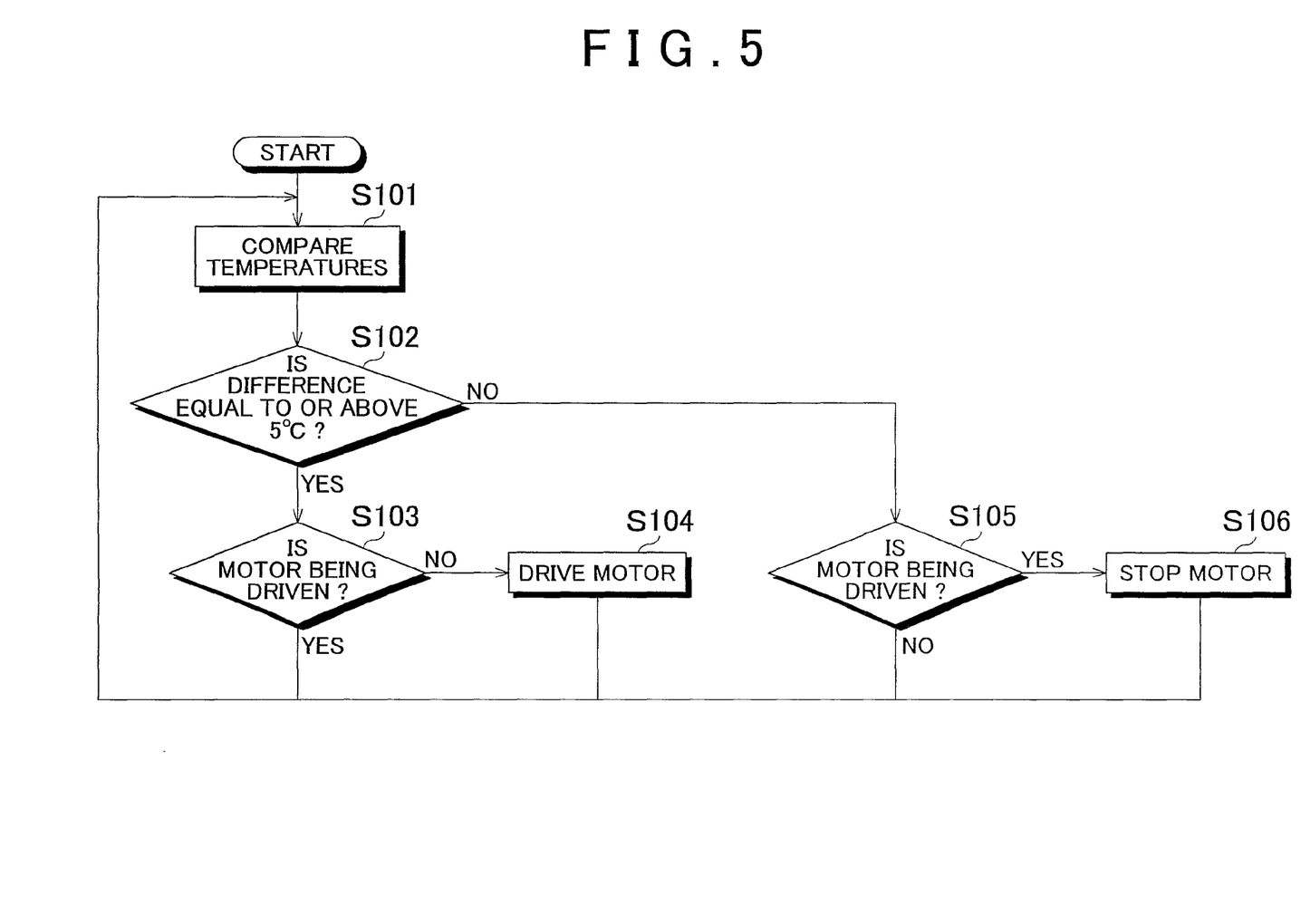
FIG. 5 is a flowchart showing a method of driving the motor according to the first embodiment of the invention.

Next, a method of controlling the motor 15 will be described with reference to FIG. 3 and FIG. 5. FIG. 5 is a flowchart showing the method of driving the motor 15. The routine shown in the flowchart is executed by the battery ECU 63.

First, the temperature information output from the first temperature sensor 61 is compared with the temperature information output from the second temperature sensor 62 (step S101), and it is determined whether the difference between the temperatures of the cooling liquid detected by the first temperature sensor 61 and the second temperature sensor 62 is equal to or above 5° C. (step S102). When it is determined that the temperature difference is equal to or above 5° C., it is determined whether the switch of the motor power supply 64 is on (step S103). When it is determined that the switch of the motor power supply 64 is off, the switch is turned on (step S104).

When the switch of the motor power supply 64 is turned on, the gear rotational shaft 71 is rotated according to the rotational motion of the output shaft 15a of the motor 15, due to the magnetic action of the magnets 41a, 41b, 42a, 42b. The rotational force of the gear rotational shaft 71 is transmitted to the first corner transmission gear 21b, the first intermediate transmission gear 21f, the center transmission gear 21a, the second to fourth intermediate transmission gears 21g, 21h, 21i, and the second to fourth corner transmission gear 21c (not shown), 21d (not shown), 21e, in the stated order. Thus, each of the agitation plates 13a to 13e is rotated. Due to the agitation action of the agitation plates 13a to 13e, the lower cold portion of the cooling liquid is mixed into the upper warm portion of the cooling liquid, and thus, the temperature of the cooling liquid is equalized.

Also, by rotating the first to fourth agitation plates 13b to 13e disposed in the four corner portions of the power supply casing 11, it is possible to reliably agitate the portions of the cooling liquid in the regions close to the inner peripheral wall of the power supply casing 11. The cooling liquid is likely to stagnate in the regions if the forced circulation system in the related technology is employed.

Also, by changing the configuration of the transmission mechanism, the positions of the agitation plates 13a to 13e can be easily changed. This increases flexibility in the design of the power supply casing 11.

Also, because the plurality of agitation plates 13a to 13e are rotated using one motor 15, the number of motors is reduced, and thus, the cost is reduced. Further, because the gear rotational shaft 71 is rotated by the magnetic force applied from the outside of the power supply casing 11, the cooling liquid is reliably sealed in the power supply casing 11.

Figure 6:
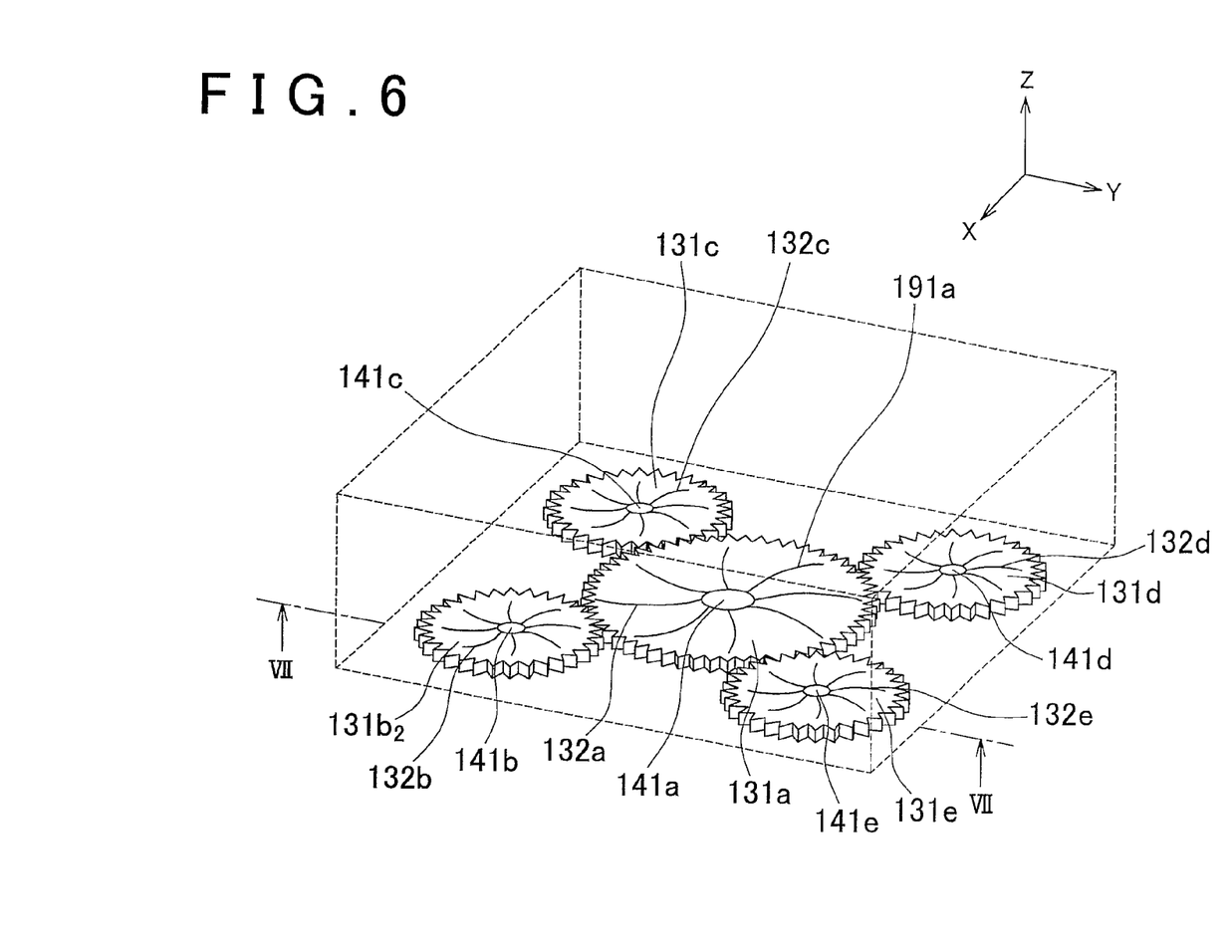
FIG. 6 is a perspective view showing a plurality of agitation members according to a second embodiment of the invention.
Figure 7:
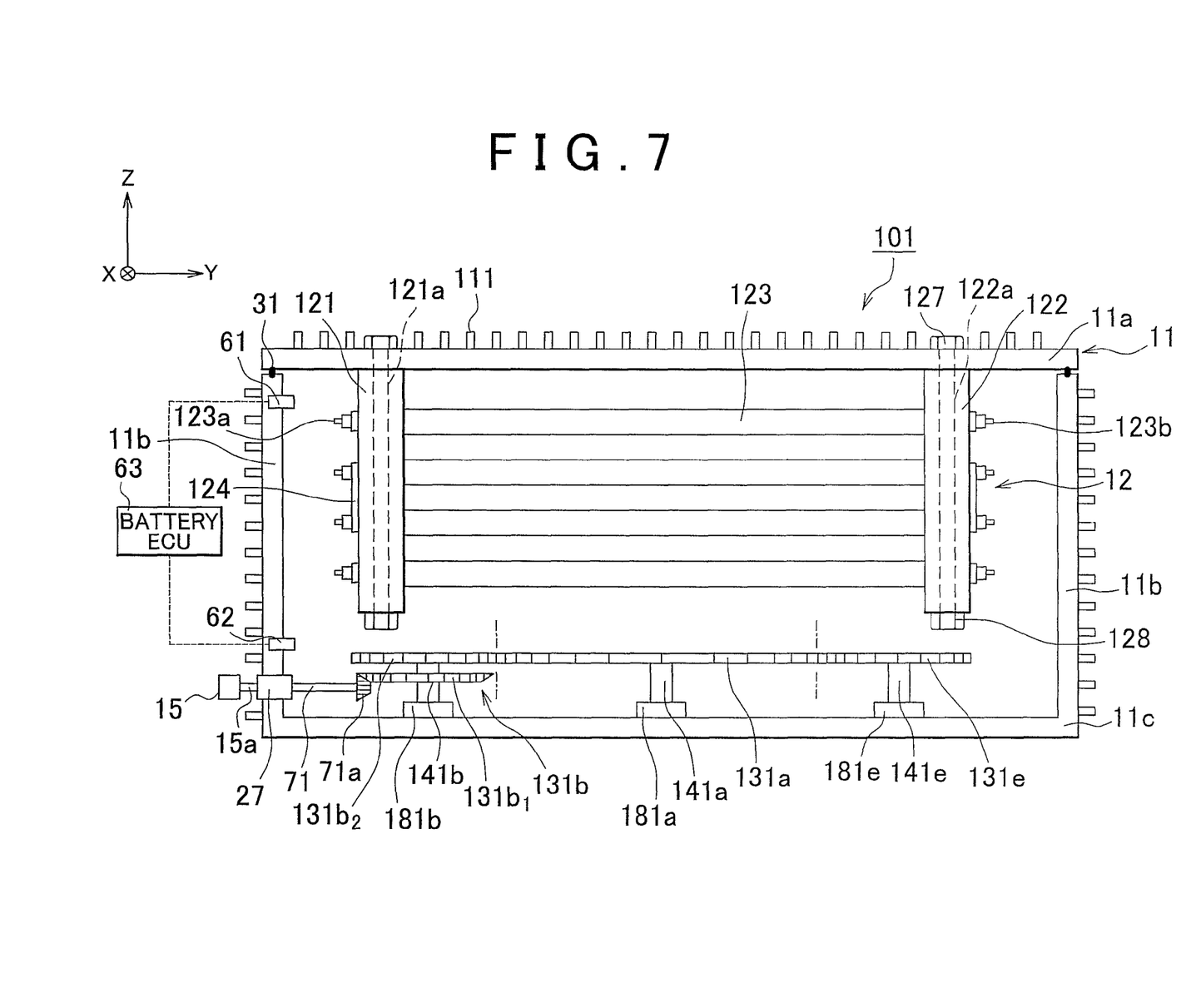
FIG. 7 is a cross sectional view showing a power supply device, taken along line VII-VII in FIG. 6.

A power supply device 101 according to a second embodiment will be described with reference to FIG. 6 and FIG. 7. FIG. 6 is a perspective view showing agitation members that agitate the cooling liquid in the power supply casing. The dotted line indicates the outline of the power supply casing. FIG. 7 is a cross sectional view taken along line VII-VII in FIG. 6. A large agitation plate 131a is projected on the cross section shown in FIG. 7. The same and corresponding components as in the first embodiment are denoted by the same reference numerals, and the detailed description thereof will be omitted.

A center rotational shaft 141a, which extends in the vertical direction, is disposed at the center of the power supply casing 11. The lower end portion of the center rotational shaft 141a is rotatably supported by a center rotational bearing portion 181a of radial type, which is fixed on the bottom portion of the power supply casing 11.

A large spur gear 131a is attached to the upper end portion of the center rotational shaft 141a. A plurality of agitation fins 132a are formed on the upper surface of the large spur gear 131a. The large spur gear 131a and the agitation fins 132a constitute the first agitation member according to the invention.

First to fourth corner rotational shafts 141b to 141e, which extend in the vertical direction, are disposed close to the four corner portions of the power supply casing 11. The first to fourth corner rotational shafts 141b to 141e are rotatably supported by first to fourth corner bearing portions 181b to 181e of radial type, respectively. The first to fourth corner bearing portions 181b to 181e are fixed on the bottom portion of the power supply casing 11. The second and third corner bearing portions 181c, 181d are not shown.

A two-stage gear 131b is attached to the upper end portion of the first corner rotational shaft 141b. The two-stage gear 131b includes a bevel gear $131b_1$ at a lower side, and a first small spur gear $131b_2$ at an upper side. A plurality of agitation fins 132b are formed on the upper surface of the first small spur gear $131b_2$ at the upper side. The bevel gear $131b_1$ at the lower side engages with the output gear 71a. The first small spur gear $131b_2$ and the agitation fins 132b constitute the second agitation member according to the invention.

Second to fourth small spur gears 131c to 131e are attached to the upper end portions of the second to fourth corner rotational shafts 141c to 141e, respectively. A plurality of agitation fins 132c to 132e are formed on the upper surfaces of the second to fourth small spur gears 131c to 131e, respectively. The second small spur gear 131c and the agitation fins 132c constitute the second agitation member according to the invention. The third small spur gear 131d and the agitation fins 132d constitute the second agitation member according to the invention. The fourth small spur gear 131e and the agitation fins 132e constitute the second agitation member according to the invention.

The first small spur gear $131b_2$ at the upper side, which is attached to the first corner rotational shaft 141b, engages with the large spur gear 131a attached to the center rotational shaft 141a. The large spur gear 131a engages with the second to fourth small spur gears 131c to 131e.

According to the embodiment, it is possible to obtain the same effect obtained in the first embodiment. The large spur gear 131a and the small spur gears $131b_2$, and 131c to 131e are used as the agitation members that agitate the cooling liquid, and as the transmission mechanism that transmits the driving power for the motor 15. Thus, the number of components is reduced, and therefore, the cost of the power supply device 101 is reduced.

Figure 8A:
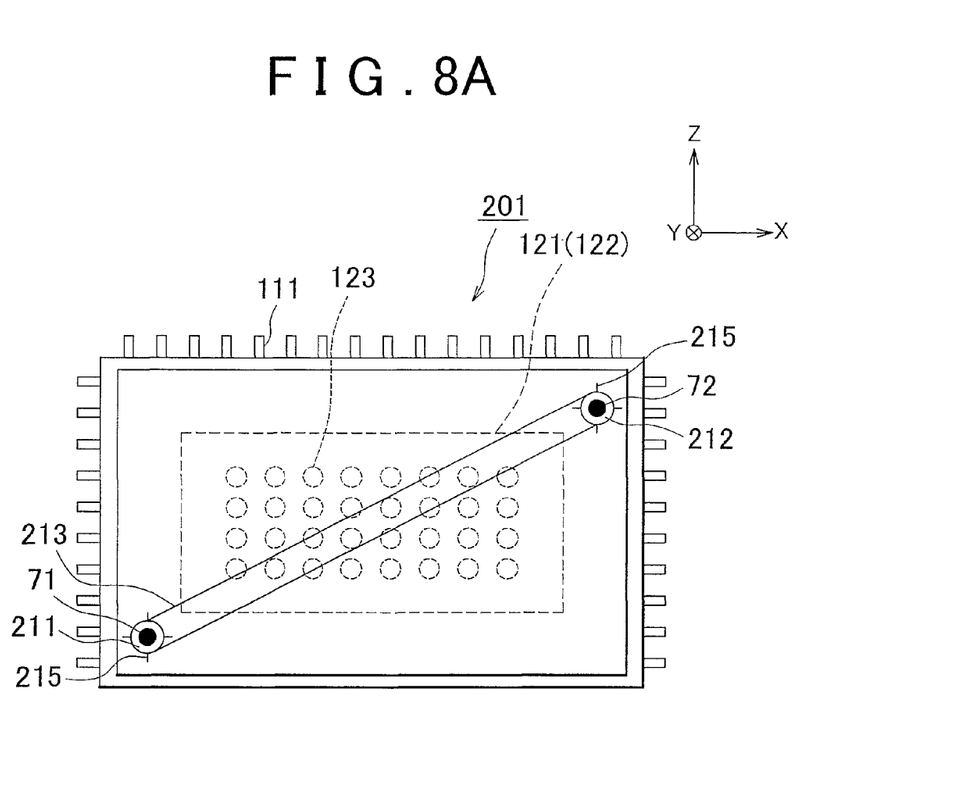
FIG. 8A is a cross sectional view showing a power supply device according to a third embodiment of the invention.
Figure 8B:
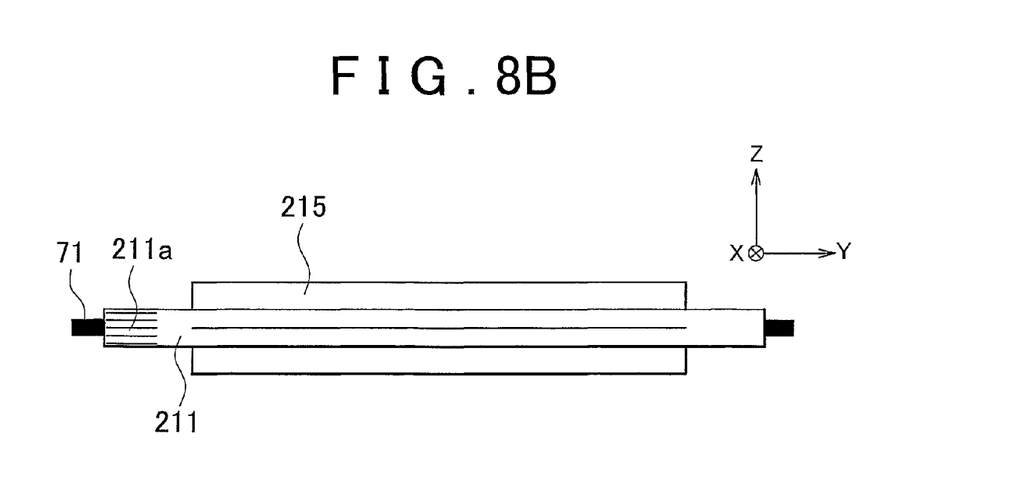
FIG. 8B is an enlarged view showing agitation members according to the third embodiment.

A power supply device 201 according to a third embodiment will be described with reference to FIGS. 8A and 8B. FIG. 8A is a cross sectional view showing the power supply device 201. Cylindrical cells 123 and cell folders 121 (122) are projected, and shown by the dotted line on the cross section shown in FIG. 8A, to clearly indicate the positional relation between the cylindrical cells 123 and the cell folders 121 (122), and a timing belt. FIG. 8B is an enlarged diagram showing the agitation member. The detailed description of the same and corresponding components as in the first embodiment will be omitted.

In the cross section taken along the plane perpendicular to the lengthwise direction of the cylindrical cells 123, each of the pair of fin rotational shafts 71, 72 is disposed outside the assembled battery 12 to be positioned in the corner portion of the power supply casing 11. The fin rotational shafts 71, 72 extend in parallel with the axial direction of the cylindrical cells 123.

The end portions of each of the fin rotational shafts 71, 72 are rotatably supported by bearing portions (not shown) provided on the side wall portion 11b of the power supply casing 11.

The inner peripheral surface of a belt roller 211 is fixed to the outer peripheral surface of the fin rotational shaft 71. The length of the belt roller 211 in the lengthwise direction (axial direction) of the belt roller 211 is smaller than the length of the fin rotational shaft 71 in the lengthwise direction (axial direction) of the fin rotational shaft 71. A plurality of agitation fins 215 are formed on the outer peripheral surface of each of the belt rollers 211, 212. The agitation fins 215 extend in the lengthwise (axial) direction of the belt rollers 211, 212. The agitation fins 215 are arranged in the circumferential direction.

Because the fin rotational shafts 71, 72 with the agitation fins 215 are disposed such that the fin rotational shafts 71, 72 extend in the Y-axis direction along the lower edge and the upper edge of the power supply casing 11, respectively, it is possible to reliably agitate the portions of the cooling liquid near the lower edge and the upper edge of the power supply casing 11. Also, because the fin rotational shafts 71, 72 are disposed in parallel with the axial direction of the cylindrical cells 123, the portions of the cooling liquid, which are moved according to the rotational motion of the agitation fins 215, are supplied directly to areas around the cylindrical cells 123 (that is, the cell folders 121, 122 do not interfere with the flow of the portions of the cooling liquid). Thus, it is possible to reliably agitate the portions of the cooling liquid in the areas close to the cylindrical cells 123.

A projection/depression portion 211a is formed on one end portion of the belt roller 211. The projection/depression portion 211a engages with a projection/depression portion (not shown) formed on the rear surface of the timing belt 213. The fin rotational shaft 72 has the same configuration as that of the fin rotational shaft 71.

The timing belt 213 is wound around the projection/depression portions 211a of the fin rotational shafts 71, 72. The timing belt 213 is disposed outside the assembled battery 12, that is, between the cell folder 121 and the side wall portion 11b of the power supply casing 11.

The fin rotational shaft 71 corresponds to the gear rotational shaft 71 in the first embodiment. The fin rotational shaft 71 is inserted into the right chamber of the rotational plate housing portion 27, and rotated by the motor 15. According to the third embodiment, it is possible to obtain the same effects obtained in the first embodiment. Further, because the timing belt is used as the transmission mechanism, the driving power generated by the motor 15 is transmitted more easily than in the configurations in the first and second embodiments.

Figure 9:
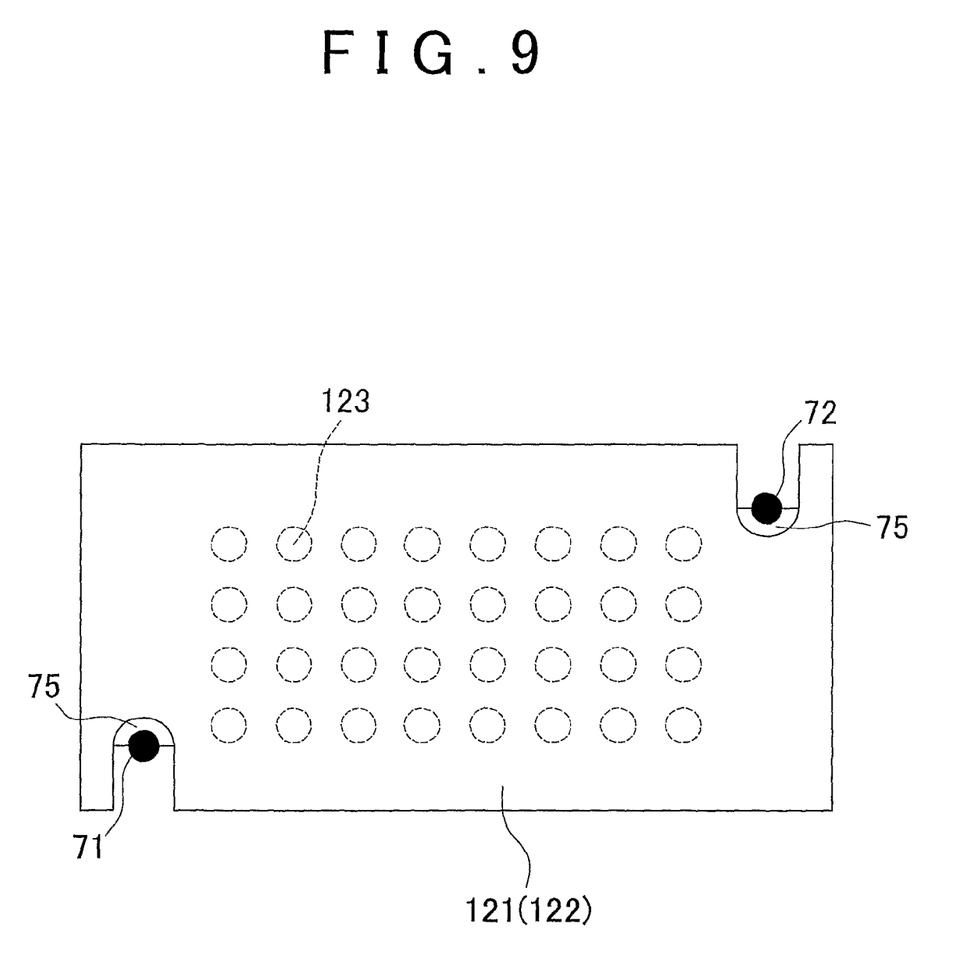
FIG. 9 is a cross sectional view showing an assembled battery in which fin rotational shafts are disposed between a pair of cell folders according to an embodiment of the invention.

As shown in FIG. 9, the fin rotational shaft 72 may be disposed in an area inside the cell folders 121, 122. In this case, bearing portions 75, which rotatably support the fin rotational shaft 72, may be formed in the cell folders 121, 122. This eliminates the necessity of separately providing bearing members.

Also, the distribution of heat generated by the assembled battery 12 may be determined, and the belt roller may be disposed in an area close to a portion of the assembled battery 12, which generates a larger amount of heat than the other portion of the assembled battery 12. Thus, it is possible to reliably agitate the cooling liquid in the area where the temperature is high. For example, when the cylindrical cell 123 positioned in the center of the assembled battery 12 generates a large amount of heat, the fin rotational shaft 72 may be disposed adjacent to the cylindrical cell 123 in the center of the assembled battery 12. In this case, the bearing portions for the fin rotational shaft 72 may be formed in the cell folders 121, 122, as described above.

In the third embodiment, the belt member is used. However, the transmission mechanism may be formed by winding a chain around sprockets provided on the fin rotational shafts 71, 72.

In each of the above-described embodiments, the assembled battery, in which the plurality of cylindrical cells are disposed such that axes of the cylindrical cells extend in parallel with each other, is used as the power supply body. However, the invention may be applied to a rectangular power supply body in which a plurality of power supply elements are stacked, or an electric double layer capacitor. In the electric double layer capacitor, a plurality of positive electrodes and a plurality of negative electrodes are alternately stacked, and a separator is interposed between each pair of the positive electrode and the negative electrode. Further, the invention may be applied to an agitation structure for agitating the cooling liquid that cools a fuel cell.

The motor power supply 64 may be turned off to prohibit the agitation action, when the temperature detected by the second temperature sensor 62 is higher than the temperature detected by the first temperature sensor 61. This is because if the cooling liquid is agitated in this case, the temperature of the portions of the cooling liquid close to the assembled battery 12 is increased.

What is claimed is:

1. A power supply device in which a power supply body, and a cooling liquid that cools the power supply body are housed in a power supply casing, comprising:
   a plurality of agitation members that agitate the cooling liquid;
   a drive motor that drives the agitation members; and
   a transmission mechanism that connects the plurality of agitation members, and transmits driving power from the drive motor to the plurality of agitation members;
   wherein the transmission mechanism includes gears that are attached to rotational shafts of the plurality of agitation members, respectively, and that engage with each other.

2. The power supply device according to claim 1, wherein the agitation members include a first agitation member disposed at a center of the power supply casing, and a second agitation member disposed in a corner portion of the power supply casing.

3. The power supply device according to claim 2, wherein the first agitation member and the second agitation member are gears that constitute a portion of the transmission mechanism, and that engage with each other.

4. The power supply device according to claim 3, wherein the power supply body is fixed to an upper wall portion of the power supply casing, and the agitation members are disposed below the power supply body.

5. The power supply device according to claim 1, wherein the power supply body is fixed to an upper wall portion of the power supply casing, and the agitation members are disposed below the power supply body.

6. The power supply device according to claim 1, wherein:
the agitation members include a plurality of rotational shafts and an agitation fin formed on each of the rotational shafts; and
the transmission mechanism is a belt or a chain that connects the rotational shafts.

7. The power supply device according to claim 6, wherein:
the power supply body is formed by disposing a plurality of cylindrical power supplies between a pair of support members such that axes of the cylindrical power supplies extend in parallel with each other; and
each of the rotational shafts is disposed in parallel with an axial direction of each of the cylindrical power supplies.

8. The power supply device according to claim 7, wherein bearing portions for at least one of the rotational shafts are formed in the respective support members.

9. The power supply device according to claim 1, further comprising:
a first temperature sensor provided in the power supply casing at a position above the power supply body; and
a second temperature sensor provided in the power supply casing at a position below the power supply body.

10. The power supply device according to claim 9, further comprising:
a control portion that drives the drive motor when a difference between a first temperature detected by the first temperature sensor and a second temperature detected by the second temperature sensor is equal to or above a predetermined value.

11. The power supply device according to claim 1, wherein the power supply body is fixed to an upper wall portion of the power supply casing and the agitation members are disposed below the power supply body.

12. A method of agitating the cooling liquid in the power supply device according to claim 9, comprising:
determining a difference between a first temperature detected by the first temperature sensor and a second temperature detected by the second temperature sensor;
determining whether the determined difference is equal to or above a predetermined value;
determining whether the motor is being driven; and
driving the motor when it is determined that the difference is equal to or above the predetermined value, and the motor is stopped.

* * * * *